United States Patent [19]

Kafka et al.

[11] Patent Number: 4,646,308
[45] Date of Patent: Feb. 24, 1987

[54] SYNCHRONOUSLY PUMPED DYE LASER USING ULTRASHORT PUMP PULSES

[75] Inventors: James D. Kafka; Thomas M. Baer, both of Mountain View, Calif.

[73] Assignee: Spectra-Physics, Inc., San Jose, Calif.

[21] Appl. No.: 782,765

[22] Filed: Sep. 30, 1985

[51] Int. Cl.$^4$ .............................................. H01S 3/10
[52] U.S. Cl. ..................................... 372/25; 372/53; 372/5; 372/22
[58] Field of Search ...................... 372/25, 53, 22, 9, 5

[56] References Cited

U.S. PATENT DOCUMENTS 4,612,641 9/1986 Corkum ................................ 372/25

Primary Examiner—Leon Scott, Jr.
Attorney, Agent, or Firm—Donald C. Feix; Thomas M. Freilburger; Paul Davis

[57] ABSTRACT

The output of a continuous wave modelocked Nd:YAG laser is first pulse compressed and then frequency doubled from infrared to green, to provide a new pumping source for a synchronously pumped dye laser. The disclosed apparatus and methods can achieve tunable subpicosecond pulses at relatively high average power, over 300 milliwatts. The 1064 nanometer output of the pulse compressor is frequency doubled to 532 nanometers so as to provide 3.5 picosecond pump pulses at 82 MHz and average power exceeding one watt. When this is used to pump a Rhodamine 6G dye laser, tunable pulses as short as 190 femtoseconds output can be obtained from the dye laser, with average power over 300 milliwatts. With the addition of a cavity dumper, tunable subpicosecond pulses of 80 kilowatt peak power have been generated.

7 Claims, 6 Drawing Figures

SYNCHRONOUSLY PUMPED DYE LASER USING ULTRASHORT PUMP PULSES

BACKGROUND OF THE INVENTION

The invention relates to lasers, and more particularly to methods and apparatus for producing ultrashort pulses from a synchronously pumped dye laser efficiently and without sacrificing power, using a new pumping source.

Pulse compression and its uses in providing a narrow pulsewidth pumping source for a synchronously pumped dye laser are known. The shortened width pumping source causes the dye laser to produce an output beam of shorter pulsewidth.

Synchronous pumping is well known as enabling the generation of short tunable pulses from dye lasers. Ausschnitt, Jain and Heritage [C. P. Ausschnitt, R. K. Jain and J. P. Heritage, IEEE J. Quantum Electron. QE-15, 912 (1979); and C. P. Ausschnitt, and R. K. Jain, Appl. Phys. Lett. 32, 727 (1978)] disclosed the use of a pulsed pumping source which may be an argon or a frequency doubled Nd:YAG laser, to synchronously pump a dye laser. In connection with that system the authors discussed the dependence of the dye laser pulsewidth on the width of the pumping pulse, showing that with shorter pump pulses, shorter dye laser output pulses will result. They also predicted that the output pulsewidth from a synchronously pumped dye laser should depend upon the square root of the pump pulse duration.

More recently, A. M. Johnson and W. M. Simpson have synchronously pumped a Rhodamine 6G dye laser and obtained pulses as short as 210 femtoseconds, with 40 milliwatts of average power [A. M. Johnson and W. M. Simpson, JOSA B 2, 619 (1985)]. Their pump source consisted of a continuous wave (CW) modelocked Nd:YAG laser which was first frequency doubled and then pulse compressed to 460 fsec [A. M. Johnson, R. H. Stolen and W. M. Simpson, Appl. Phys. Lett. 44, 729 (1984)].

More typically, dye lasers have been pumped with a cw modelocked Nd:YAG source which is merely frequency doubled, with or without a cavity dumper on the output of the dye laser.

All of these publications are incorporated by reference in this patent application in accordance with §608.01(p) of the *Manual of Patent Examining Procedure* of the United States Patent and Trademark Office.

In copending application Ser. No. 729,376, filed May 1, 1985, there is disclosed a pulse compression apparatus capable of compressing a relatively long width optical pulse to a short width pulse. The copending application Ser. No. 729,376 filed May 1, 1985 is assigned to the same Assignee as the Assignee of this application and is incorporated by reference in this application in accordance with the provisions of Section 608.01(p) of the *Manual of Patent Examining Procedure* of the United States Patent and Trademark Office. The pulse compressor therein utilized a color generator which included an optical fiber, for broadening the bandwith of the long pulse to include any additional colors required for compression to the short pulse. The pulse compressor device also included a grating aligned with the output of the color generator at a grazing incidence angle effective for producing a compact grating structure, reduced ellipticity of the beam output from the compressor and high efficiency of light transmission through the device. The present invention can utilize this type of pulse compression device as a part of the method and system disclosed herein. The pulse compressor of the referenced application is very efficient, and efficiency in pulse compression is important to attaining the maximum benefit of the present invention.

In the prior art, including that listed above, ultrashort dye laser pulses were obtained at about the order of magnitude of pulsewidth of the present invention, but at much lower efficiency and much lower output power. Pulse compression of a pumping source has been used, but in combination with frequency doubling which was performed first, as noted in connection with Johnson and Simpson. None of the systems disclosed in the prior art was able to achieve an ultrashort pulsewidth output from a dye laser, particularly a subpicosecond pulsewidth, at relatively high average power as does the system of the present invention described below.

SUMMARY OF THE PRESENT INVENTION

It is an important object of the present invention to produce a subpicosecond dye laser output at relatively high average power, at power levels unknown in the prior art, using an efficent new pumping source.

In accordance with the present invention, the pulsed output of a laser, such as a continuous wave modelocked Nd:YAG laser, is pulse compressed with an infrared pulse compressor, to narrow the pulsewidth of the infrared beam from the laser pumping source. Peak power is increased although average power at this stage is decreased significantly, limited by the efficiency achievable in pulse compression.

The output of the pulse compressed infrared beam is then frequency doubled to produce an output in the green light range. This output may have a pulsewidth on the order of a few picoseconds, and may have an average power of about one watt.

The frequency doubled green output is then used to pump a synchronously pumped dye laser. This produces from the dye laser a subpicosecond output at high average power, through efficient pulse compression and, very importantly, through efficient frequency doubling of the infrared beam, whose pulses are at high peak power going into the frequency doubler.

The frequency doubled green output may be at a pulsewidth of about 3.5 picoseconds, and the resulting dye laser output may have a pulsewidth in the range of about 200 to 300 femtoseconds or shorter, at about 300 milliwatts or greater average power.

The pulse compressor preferably comprises a single mode optical fiber, providing self phase modulation of the pulses, and a grazing incidence grating pair as a dispersive delay line. The grating pair may be in a single pass configuration, comprising a single grating with 90% efficiency, and a roof prism, all as disclosed in the above referenced copending application. Additionally, the grating pair can be used in a double pass configuration employing a single grating and two roof prisms.

In a preferred embodiment, a CW modelocked Nd:YAG laser, as the pumping source, generates 80 picosecond pulses and at a repetition rate of about 82 MHz, with 9 watts of average power.

In another embodiment of the present invention, a method for pumping an infrared dye laser comprises efficiently compressing the pulsed infrared output of a pumping laser to a narrower pulsewidth, increasing peak power, to a pulsewidth at least as narrow as the relaxation time of the infrared dye of the dye laser. The infrared dye laser is pumped with the resulting narrow pulsewidth beam.

Again, the pulse compressor used in the method preferably comprises a single mode optical fiber, providing self phase modulation of the pusles, and a grazing incidence grating pair as a dispersive delay line.

In a further embodiment of the invention, a dye laser is pumped with a pumping beam which is first pulse compressed and then frequency doubled, and the subpicosecond output of the dye laser is cavity dumped and then put through an additional pulse compressor step using a dye laser pulse compressor functioning at 600 nanometer wavelength, to produce extremely short tunable pulses on the order of 42 femtoseconds. These pulses have the highest average power for pulses of about less than 50 femtoseconds duration.

The present invention therefore enables ultrashort tunable pulses to be obtained from a synchronously pumped dye laser, at average output power levels unknown in the prior art at these pulsewidths. This is accomplished through an arrangement of steps and components in a pumping source to provide for highly efficient pulse compression and frequency doubling.

Ultrashort pulsewidth dye laser pumping apparatus and methods which embody the features and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIGS. 5 and 6 correspond to respective FIGS. 4 and 5 of U.S. application Ser. No. 729,376 filed May 1, 1985 and incorporated by reference in this application in accordance with Section 608.01(p) of the *Manual of Patent Examining Procedure* as noted above.

DESCRIPTION OF PREFERRED EMBODIMENTS

Figure 1:
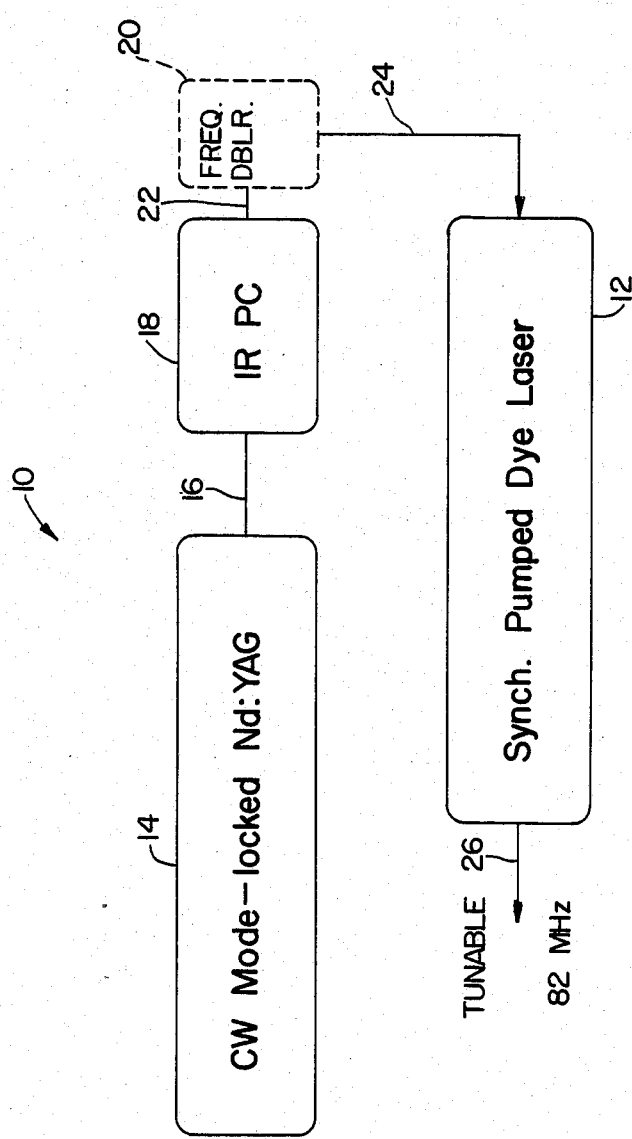
FIG. 1 is a diagrammatic view showing a system in accordance with one embodiment of the invention for pumping a synchronously pumped dye laser with ultrashort pump pulses to produce a dye laser output of ultrashort pulsewidth at relatively high average power.

In the drawings, FIG. 1 shows in diagrammatic representation a system 10 in accordance with the present invention, for pumping a synchronously pumped dye laser and obtaining ultra-short tunable pulses therefrom.

The system 10 of FIG. 1 includes, in addition to the synchronously pumped dye laser 12, a laser pumping source preferably comprising a continuous wave modelocked Nd:YAG laser 14, which produces a pulsed infrared beam 16, an infrared pulse compressor 18, and a frequency doubling element 20.

The infrared pulse compressor 18 is designed so as to pulse compress the output 16 of the Nd:YAG laser as efficiently as possible. And to that end, the pulse compressor 18 may comprise apparatus as disclosed in copending application Ser. No. 729,376 filed May 1, 1985. That pulse compressor, as discussed above, may comprise a single mode optical fiber, providing self phase modulation of the pulses, and a grazing incidence grating pair as a dispersive delay line. The grating pair may be in a single path configuration, comprising a single grating with 90% efficiency, and a roof prism, all as disclosed in the referenced application.

The infrared pulse compressor 18 compresses the pulsewidth of the pulsed beam 16 from the Nd:YAG laser, producing a pulse compressed output beam 22 of considerably less pulsewidth. At the same time, the pulse compressed beam 22 is of increased peak power and, inevitably, of lower average power, limited by the efficiency of the pulse compressor apparatus 18.

The pulse compressed infrared beam 22 then enters the frequency doubler 20. In the frequency doubler, the higher peak power of the infrared pulses enables more efficient frequency doubling, since frequency doubling efficiency increases with higher input power. Output power of the frequency doubler generally varyies with the square of input power, within limits.

The result is that the losses due to use of the infrared pulse compressor 18 are substantially compensated for by the increased efficiency through frequency doubling at higher peak powers.

The frequency doubler 20 produces an output beam 26 of very short pulsewidth and relatively high average power, which is used to pump a synchronously pumped dye laser 12 as indicated in FIG. 1. As was known in the prior art, when a dye laser is pumped with a shortened pulsewidth pumping beam, it will produce a shorter pulsewidth dye laser beam. As discussed above, some of the prior art predicted that the output pulsewidth from a synchronously pumped dye laser should depend upon the square root of the pump pulse duration. In some cases, and in some embodiments of the present invention, the output of the synchronously pumped dye laser can be more dramatically affected than the predicted square root dependency.

In one preferred embodiment of the invention, the CW modelocked Nd:YAG laser 14 generates 80 picosecond pulses to form the beam 16, at a repetition rate of 82 MHz, with 9 watts of average power. The infrared pulse compressor 18, configured as described above, receives the 1064 nanometer infrared beam 16 and compresses its pulsewidth to produce the infrared output beam 22 at the same wavelength, with about 3.4 watts of average power. This represents a pulse compressor throughput efficiency of almost 40% in a single pass grating pair configuration.

In order to maximize throughput, losses due to stimulated Raman scattering are preferably avoided. One preferred procedure for minimizing Raman losses is achieved by reducing the length of the monomode fiber. For a continuous wave modelocked Nd:YAG laser with 9 W average power and 80 picosecond pulses the longest length of fiber which has no Raman loss is about 30 meters. For other lasers with different peak powers the following procedure is employed to optimize fiber length. A longer fiber length is used and the power in the Raman band measured. The fiber is then cut (often at about one meter increments) until the energy in the Raman band is reduced to about less than one percent of the total energy from the fiber.

The pulse compressor in this embodiment increases peak power of the beam 16 from 1.3 kilowatt to 8.2 kilowatts, shortening the pulsewidth of the 80 picosecond beam 16 to about 5 picoseconds.

A single pass through the dispersive delay line can produce an elliptical beam (with axes at 2:1) at 3.4 watts of average power. In a double pass configuration, with a second roof prism added, compressed pulses at 2.8 watts of average power have been obtained, in a round beam. The double pass is the preferred embodiment for frequency doubling and dye laser pumping.

A single pass grating configuration may comprise two parallel gratings; however, a preferred form employs a single grating and a roof prism or two mirrors aligned perpendicular with respect to each other so as to return the beam to the grating, as illustrated in FIG. 1 of copending application Ser. No. 729,376, filed May 1, 1985 and incorporated by reference in this application.

Figure 5:
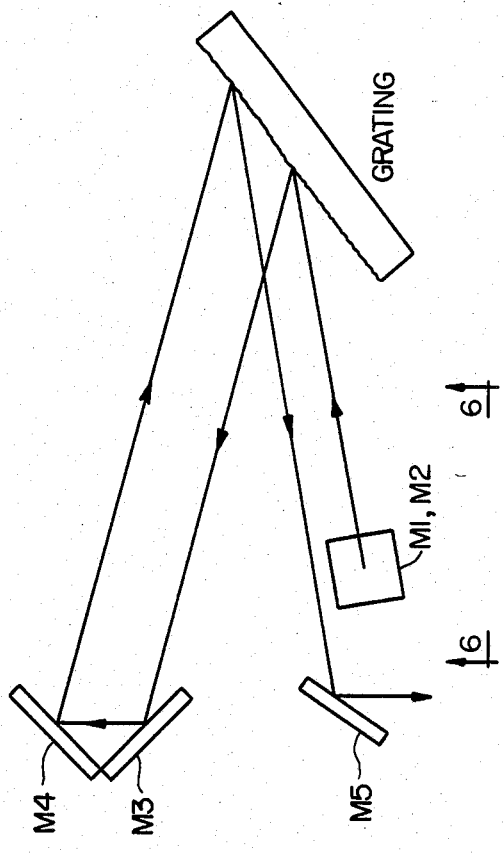
FIG. 5 is a diagrammatic plan view showing a pulse compressor which may be employed in one embodiment of the system of the invention. In the pulse compressor of FIG. 5 a single grating face is used for four diffractions of a beam.
Figure 6:
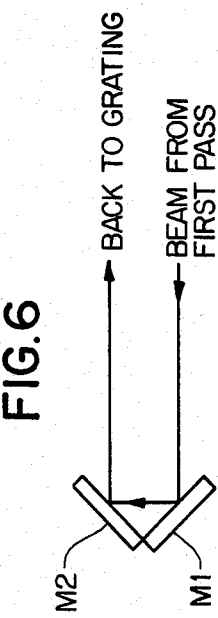
FIG. 6 is an enlarged, fragmentary view taken along the line and in the direction indicated by the arrows 6—6 in FIG. 5.

A double pass grating configuration may comprise any of the following combinations: four gratings (the first two being aligned parallel and the second two forming mirror images thereof); two parallel gratings and a mirror used to return the beam along the same path; a grating and a roof prism as in the single pass configuration, with an additional mirror to return the beam along the same path; and preferably a grating and two roof prisms as partially illustrated in FIGS. 5 and 6. In those drawing views the beam, after once being through the dispersive delay line (first pass not shown), is redirected by mirrors M1, M2 again through the dispersive delay line. It is diffracted off the grating and reflected off a roof prism M3, M4 back to the grating face, where it is again diffracted and then reflected off a mirror M5. All this follows a first, similar pass which is not shown herein but which is understood by reference to the above-identified copending application which has been incorporated herein by reference.

The frequency doubler 20 may be a 5 mm KTP crystal, for receiving the compressed infrared pulses 22 from the pulse compressor 18 and frequency doubling the 1064 nanometer wavelength light to 532 nanometers in the frequency doubled output 24. In the double pass pulse compression configuration, as high as 1.25 watt of average power has been obtained in the 532 nanometer output, representing a conversion efficiency in the frequency doubler of about 45%. In this configuration the pulsewidth of the 532 nm pulses was 3.5 picoseconds. The frequency doubler effectively reduces the pulsewidth from 5 psec to 3.5 psec.

The frequency doubled output as described above was used, in one embodiment of the invention, to pump a standard Spectra-Physics model 375B dye laser operating with the dye Rhodamine 6G. The dye concentration was $2 \times 10^{-3}$ M, the tuning element was a one plate birefringent filter, and the output coupler had a transmission of 15%. As high as 360 milliwatts of average power are obtained with this configuration, with a pulsewidth as short as 190 fsec. (The pulsewidth was best fit by a Lorentzian pulse shape.)

A very important result of this configuration is that in the frequency doubled pumping output 24, approximately the same average power in the green light can be obtained as in prior typical configurations wherein a pulse compressor was not included. Thus, even though the pulse compressor is added with its attendant losses which are inevitable, the losses are in effect recovered in the frequency doubler because of the fact that the shorter infrared pulses, of increased peak power, can be frequency doubled more efficiently.

Therefore the pumping beam 24, in accordance with the invention, may be at 532 nanometer wavelength and about 3.5 psec pulsewidth at about 82 MHz repetition rate, at average powers exceeding one watt.

As noted above, average powers from the dye laser pumped with this pumping beam have been over 300 milliwatts, and in fact powers of up to about 360 milliwatts have been obtained (at 1.1 watt of pumping power), with a pulse duration as short as 190 femtoseconds.

As compared, for example, with the above referenced prior work of Johnson and Simpson, the dye laser pulses obtained with the present invention are of comparable pulsewidth, but of considerably greater average power. Johnson and Simpson first frequency doubled the output of an Nd:YAG laser, then pulse compressed the beam to 460 fsec for pumping. By the system of the invention, on the other hand, compressing the 1064 nm pulses prior to frequency doubling produces approximately eight times longer pumping pulses but nearly ten times greater average power, which produces dye laser pulses of approximately the same duration as Johnson and Simpson but at nine times greater power.

Figure 4:
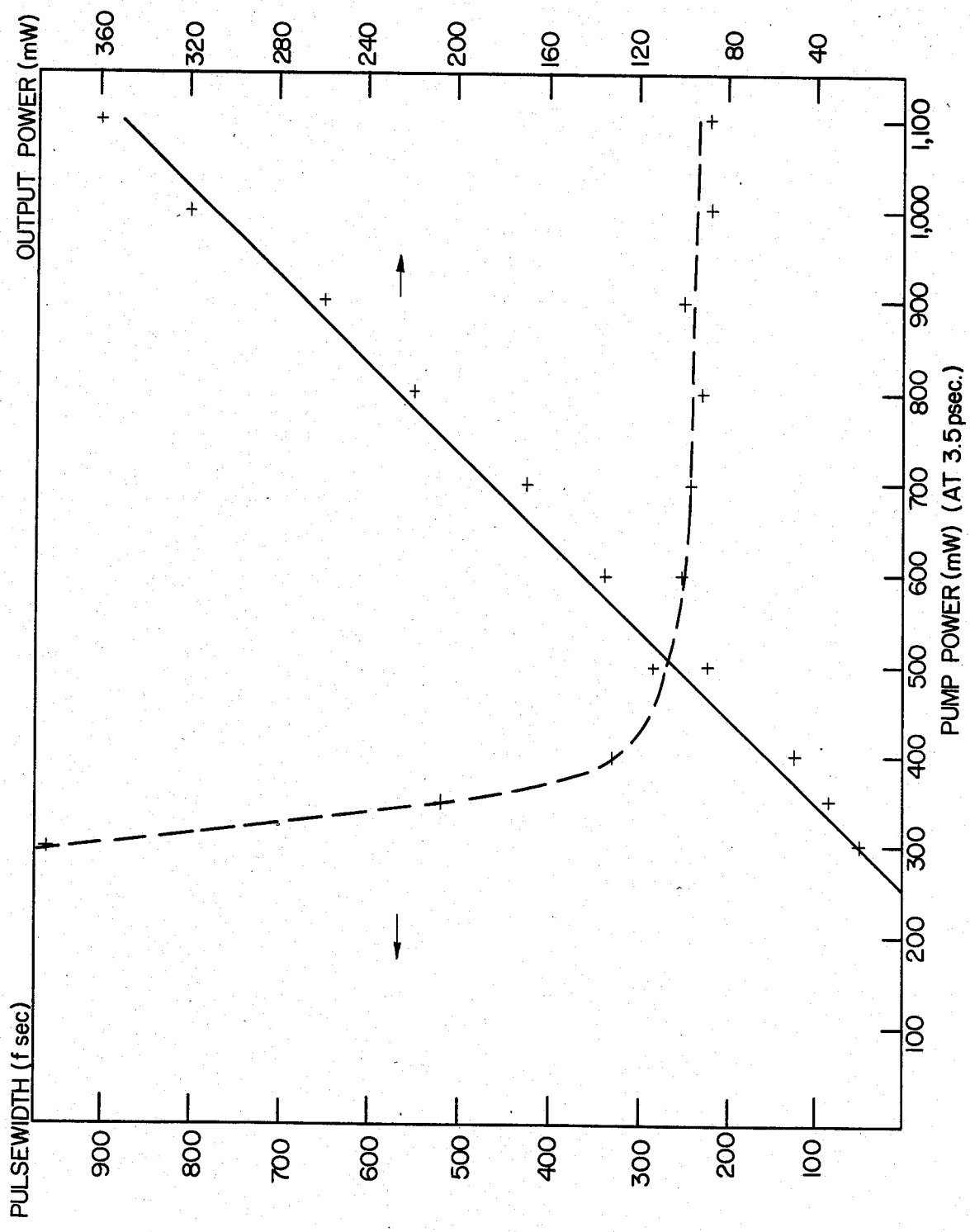
FIG. 4 is a graphic representation showing, in accordance with the methods and apparatus of the invention, the dependence of dye laser output pulsewidth on pump power, and also the dependence of average output power of the dye laser on pump power. The pumping pulsewidth in accordance with the graph of FIG. 4 is at 3.5 picoseconds.

FIG. 4 is a plot of pulsewidth vs. pump power and of output power vs. pump power, for the system parameters just described, with the pumping pulses at about 3.5 psec.

FIG. 4 illustrates an important relationship discovered in accordance with the present invention. In most systems prior to the invention, as pumping power was increased, particularly as one watt of pumped power was approached, "noise" would appear in the system and dye laser pulsewidth would actually increase. Such systems used greater pumping pulsewidths.

As shown in FIG. 4, once a threshold is passed, at around 300 to 400 milliwatts of pump power, represented by the "elbow" in the pulsewidth curve, the output dye laser pulsewidth tends to remain the same and actually to decrease further with increased pumping power, at least up to about 1.1 watt. This was not realized in the prior work, probably because although the prior art achieved ultra-short pumping pulses they were at much lower average power, in the range of 150 milliwatts.

As indicated in FIG. 4, output power of the dye laser predictably varies substantially linearly with average pump power.

In FIG. 1 the freqency doubler 20 is shown in dashed lines. In another embodiment of the system of the invention, also represented by FIG. 1, the frequency doubler 20 is eliminated, and the infrared beam 16 from the CW mode-locked Nd:YAG laser 14 is simply pulse compressed by the pulse compressor 18 and then used to pump a synchronously pumped infrared dye laser. There are available dyes which require pumping at 1064 nanometers, i.e. the wavelength of the Nd:YAG laser, without frequency doubling.

It is true that dyes pumped by visible light, such as the green light discussed in the embodiment above, tend to hold pumping energy for at least several nanoseconds, i.e. they have a reasonably long relaxation time. Those visible dyes may be pumped with relatively long pumping pulses on the order of about one nanosecond or less, without wasting pumping energy.

However, the infrared dyes which absorb at 1064 nanometers generally have very short relaxation times, sometimes only about 10 picoseconds. Not only is there an energy loss if any pumping source much greater than this relaxation time is used, but in the case of infrared dyes the dye may not even lase.

Accordingly, with a pulse compressed infrared input, a synchronously pumped infrared dye laser can be made to produce an ultra-short pulsewidth output, at reasonably high average power provided the pulse compression is accomplished efficiently. The pulse compressor 18, constructed as referenced above, does not simply cut the pulses, throwing away power, but actually compresses them. The result is that the central part of the pulse is of higher power after pulse compression.

Figure 2:
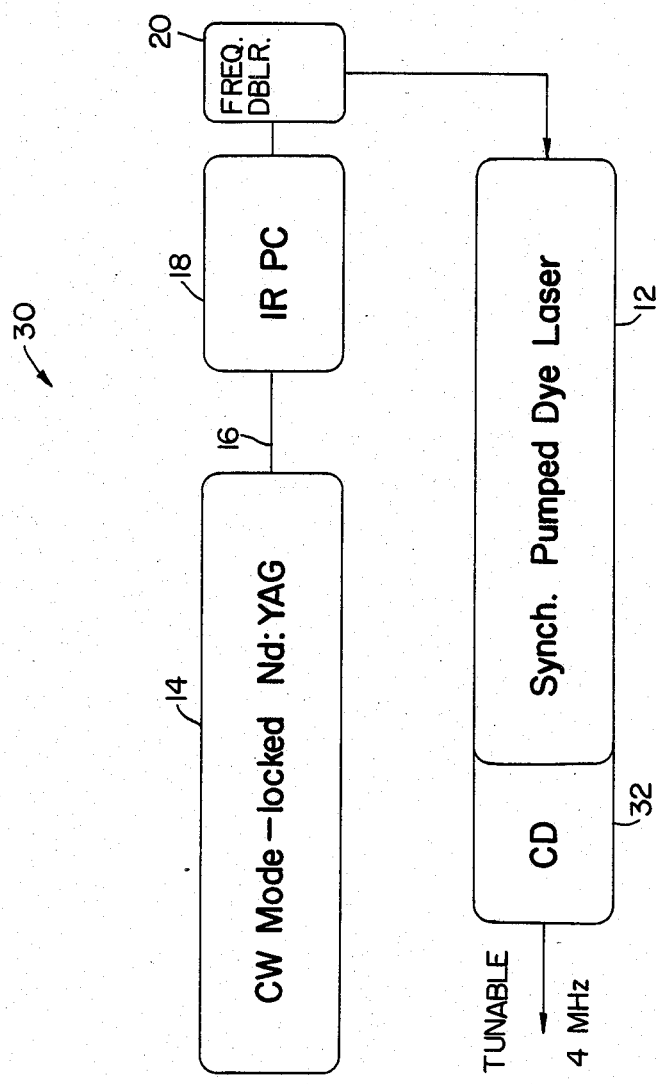
FIG. 2 is a diagrammatic view similar to that of FIG. 1, but showing the same system including a cavity dumper acting on the output of the sychronously pumped dye laser.

FIG. 2 shows a modified system 30 in accordance with the invention, wherein a cavity dumper 32 is added to cavity dump the output beam of the synchronously pumped dye laser 12. The cavity dumper 32, which may be a Spectra-Physics Model 344, greatly enhances peak power. For example, peak powers greater than 80 kW have been obtained with a Rhodamine 6G dye laser pumped by 3.5 psec pulses. These subpicosecond dye laser pulses were at 620 nm wavelength, at a high repetition rate of about 4 MHz.

Figure 3:
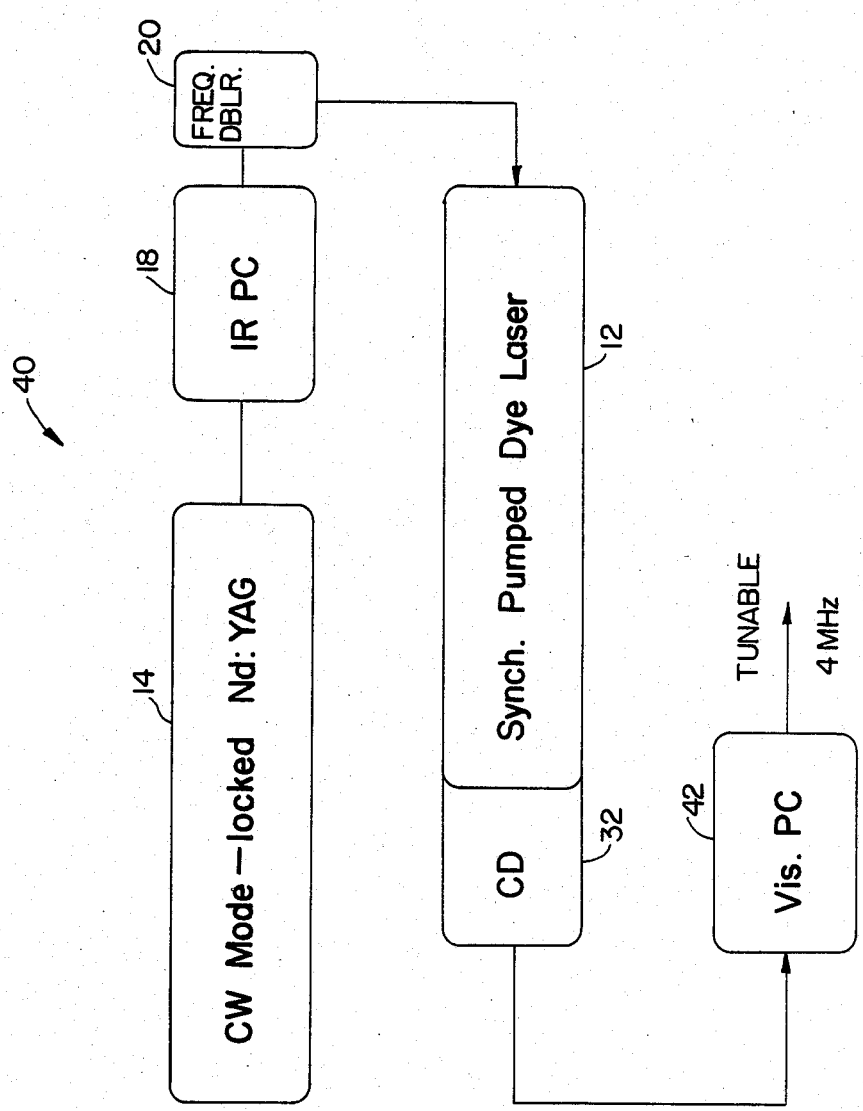
FIG. 3 is a further diagrammatic view similar to that of FIG. 1, showing another embodiment of the invention wherein the output of the sychronously pumped dye laser is cavity dumped and then further compressed in a dye laser compressor.

A further embodiment 40 of the invention is shown in FIG. 3. In this system, again the same basic components are used, including the cavity dumper 32 as in the embodiment of FIG. 2, but the cavity dumped output is then additionally pulse compressed with a dye laser pulse compressor 42. Using this system, tunable pulses as short as 42 femtoseconds have been achieved with 20 mW average power. The dye laser compressor 42 may comprise, for example, a modified Spectra-Physics Model 3610 visible light pulse compressor.

In accordance with the invention, a synchronously pumped dye laser, pumped by compressed and then frequency doubled pulses from a CW mode-locked Nd:YAG laser comprises a very efficient and useful system. With this system subpicosecond pulses have been generated, tunable throughout the range of Rhodamine 6G, with high average power. With cavity dumped operation of a Rhodamine 6G dye laser, subpicosecond pulses of 80 kW peak power have been generated. Other dyes can be pumped yielding similar tunable subpicosecond pulses. For example, using the dye LDS 821 pulses as short as 190 fsec have been generated. The pumping source of the invention allows subpicosecond pulse generation for a versatile range of dyes.

The addition of an infrared pulse compressor to a synchronously pumped dye laser system, in accordance with the invention, does not add substantial complication to the system. The pulse compressor as described is a passive device without electronics and with no components needing periodic replacement. In addition, in pump and probe experimentation, it is often necessary to have two different wavelengths of short pulses that are well synchronized. The addition of an infrared pulse compressor to a synchronously pumped dye system can produce pulses at 1064 nm and at 532 nm of a few picosecond duration which are well synchronized to the tunable subpicosecond probe pulse.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. Apparatus for producing a subpicosecond pulsewidth output from a dye laser at relatively high average power, comprising,
   a Nd:YAG pumping laser with means for generating a continuous wave mode-locked infrared laser beam,
   an infrared pulse compressor receiving the infrared beam and effective to narrow the pulsewidth of the beam, the pulse compressor compressing the infrared beam to a narrower pulsewidth, increasing peak power, to a pulsewidth at least as narrow as the relaxation time of an infrared dye of a dye laser to be pumped,
   frequency doubling means for doubling the frequency of the output of the infrared pulse compressor to produce a frequency doubled output in the green light range, and
   a synchronously pumped dye laser, positioned to be pumped by the frequency doubled green output,
   whereby a subpicosecond output may be obtained at high average power output through efficient pulse compression and frequency doubling of the pulse-compressed infrared beam.

2. Apparatus according to claim 1, wherein the frequency doubled green output is at a pulsewidth of about 3.5 picoseconds, and wherein the resulting dye laser output has a pulsewidth in the range of about 200 to 300 femtoseconds, at about 300 milliwatts average power.

3. Apparatus according to claim 2, wherein the dye laser output has a pulsewidth of about 190 to 240 femtoseconds.

4. Apparatus according to claim 1, wherein the pulse compressor comprises a single mode optical fiber, providing self phase modulation of the pulses, and a grazing incidence grating pair as a dispersive delay line.

5. The apparatus according to claim 4, wherein the grating pair is used in a double pass configuration, comprising a single grating with about 90% efficiency and two roof prisms.

6. Apparatus according to claim 1, wherein the infrared pulse compressor further comprises a monomode optical fiber with a length chosen to minimize Raman losses and maximize self-phase modulation.

7. Apparatus according to claim 1, wherein the pumping laser comprises said CW modelocked Nd:YAG laser generating 80 picosecond pulses at a repetition rate of about 82 MHz with 9 watts of average power.

* * * * *